March 23, 1971    J. F. BUFFINGTON    3,572,427
GRAIN DRYING SYSTEM

Filed Jan. 14, 1969    4 Sheets-Sheet 1

INVENTOR.
JAMES F. BUFFINGTON
BY Hobbs & Green
ATTORNEY

March 23, 1971     J. F. BUFFINGTON     3,572,427
GRAIN DRYING SYSTEM

Filed Jan. 14, 1969     4 Sheets-Sheet 2

INVENTOR.
JAMES F. BUFFINGTON
BY Hobbs & Green
ATTORNEY

INVENTOR.
JAMES F. BUFFINGTON
BY *Hobbs & Green*
ATTORNEY

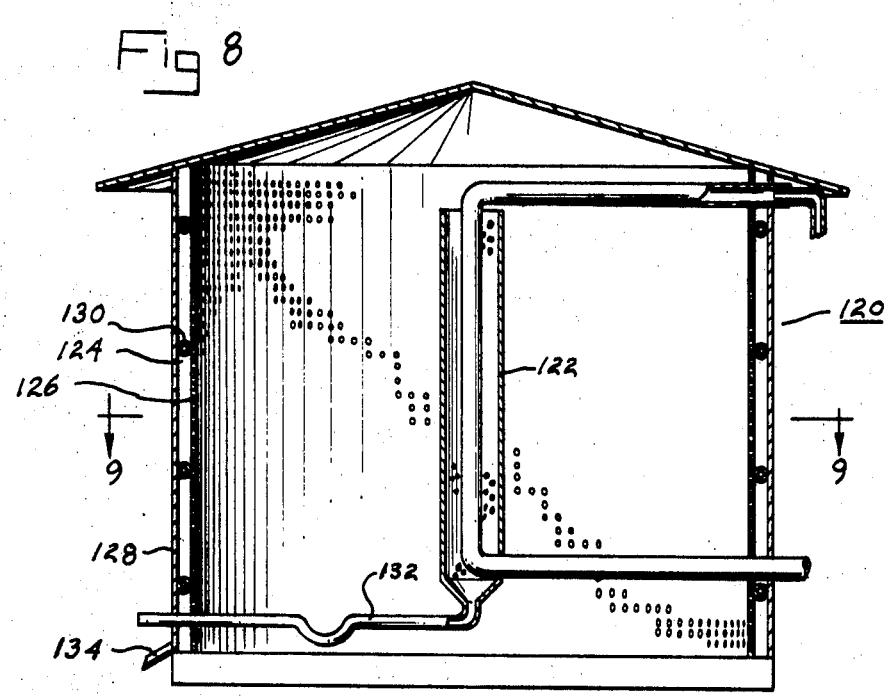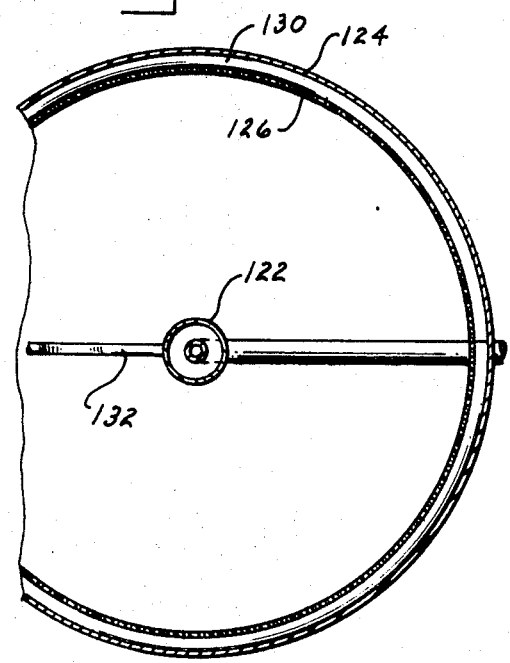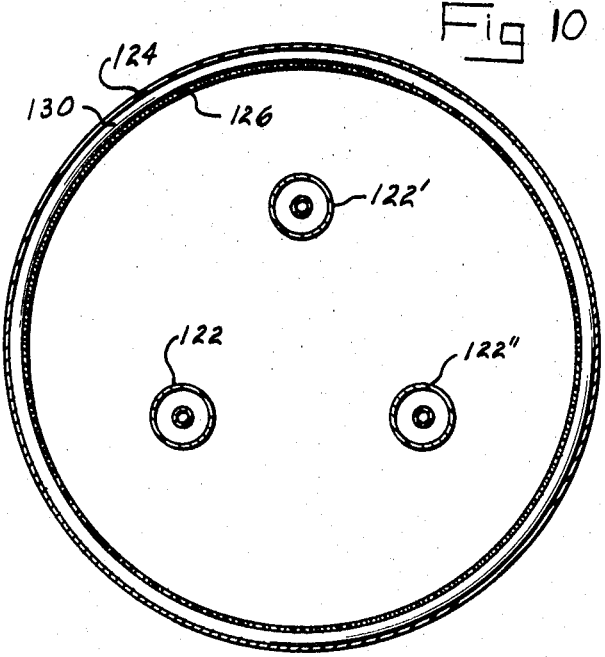

United States Patent Office 3,572,427
Patented Mar. 23, 1971

3,572,427
GRAIN DRYING SYSTEM
James F. Buffington, Plymouth, Ind. 46563
Filed Jan. 14, 1969, Ser. No. 791,058
Int. Cl. F21b 29/00
U.S. Cl. 165—61       11 Claims

ABSTRACT OF THE DISCLOSURE

A grain drying apparatus in which a plurality of stacks are disposed in a grain storage compartment. The stacks contain coils for cooling or heating fluid, and the side walls of the stacks are perforated to permit a flow of air from the stored grain into the space around the coils. The conduits connecting the cooling and heating means to the stack selectively make the coils thereof heating or cooling coils, and some of the stacks cool while other of the stacks heat.

---

The usual practice for preventing spoilage of stored grain such as corn has, in the past, been to circulate air through the mass of grain frequently, using forced air flow introduced through perforated tubes or panels in the bin or compartment in which the grain is stored. This manner of drying the grain has not been satisfactory in that the air often fails to reach all of the grain in the bin and the air circulated in the bin is frequently itself too moist to properly dry the grain. Further, in any system the drying operation must be performed either continuously or at frequenqt intervals or the grain will reabsorb sufficient moisture from the air to cause spoilage of the grain. In the past, it has been difficult to control the drying operation with sufficient accuracy to remove the required amount of moisture from the grain without unduly dehydrating the grain, or to prevent excessive reabsorption of moisture as the relative humidity of the ambient air changes over its normal wide range. It is therefore one of the principal objects of the present invention to provide a grain drying system which functions essentially within the mass of grain, essentially independently of the moisture condition of the ambient air, and which functions to expand and contract the grains of the mass periodically to remove moisture effectively without causing excessive dehydration.

Another object of the invention is to provide a grain drying system which is essentially internal in its operation and which does not rely on a large volume of air flow through the mass, or on the moisture condition of the ambient air, for effective and efficient operation.

Still another object of the invention is to provide a grain drying system of the aforesaid type which can be operated continuously with a relatively low input of power or energy, thus providing a system which can be operated relatively inexpensively over extended periods of time, and which is readily adaptable to either small or large bins or grain storage compartments.

Further objects and advantages of the invention will become apparent from the following description and accompanying drawings, wherein:

FIGS. 8, 9 and 10 are cross sectional views of modification of the present invention.

Figure 1:
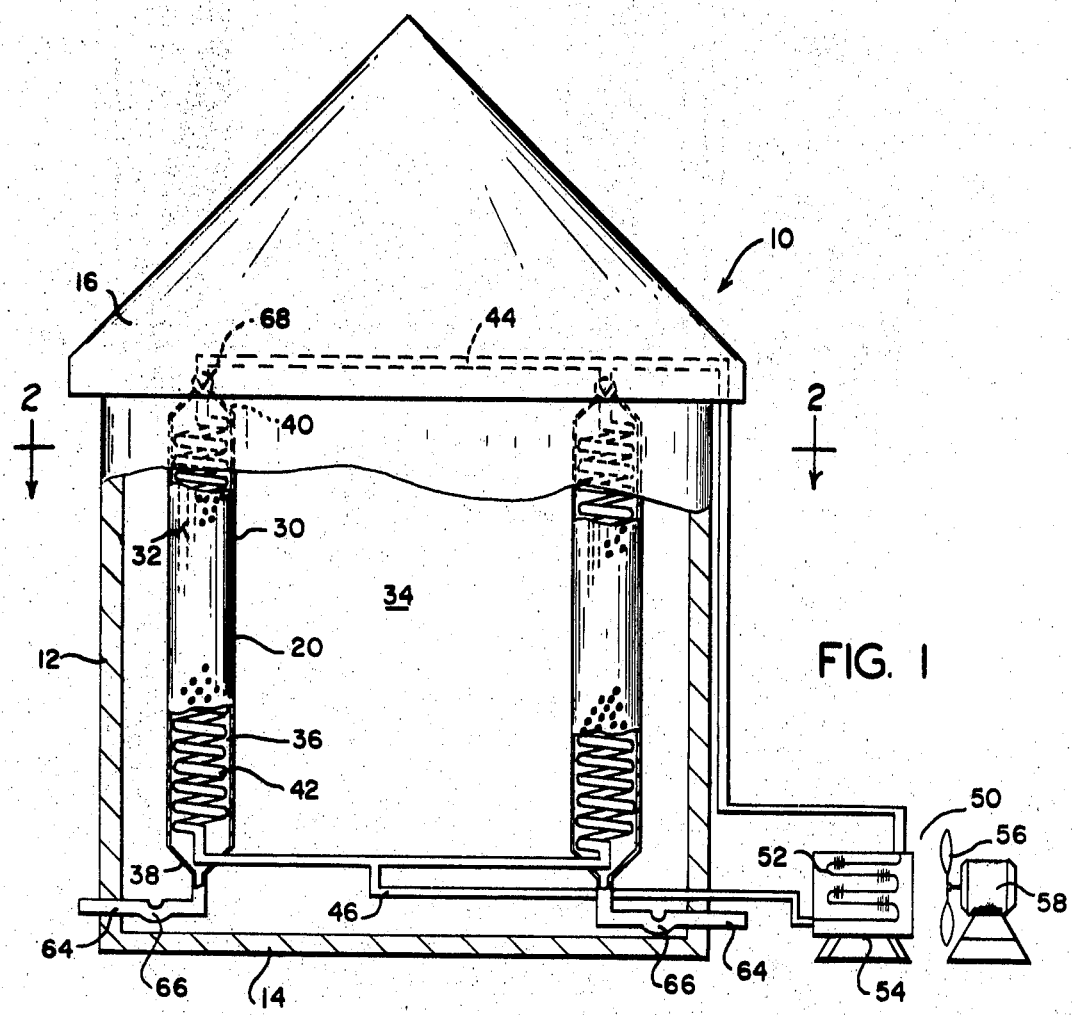
FIG. 1 is a partial elevational and vertical cross sectional view of a grain bin or the like in which the present grain drying system has been installed.
Figure 2:
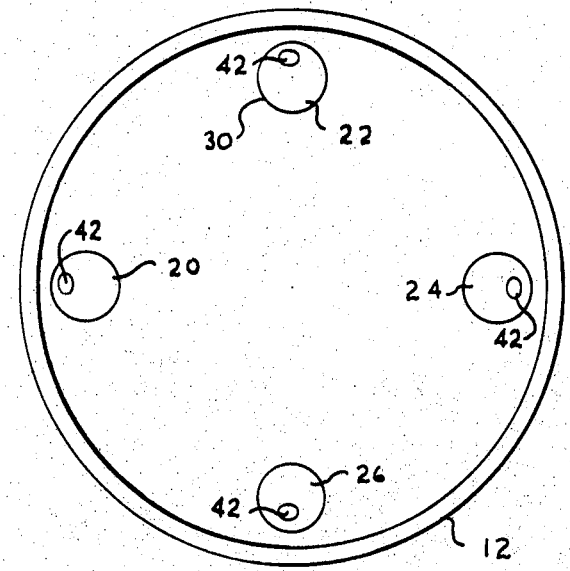
FIG. 2 is a horizontal cross sectional view of the bin and system shown in FIG. 1, the section being taken on line 2—2 of the latter figure.

Referring more specifically to the drawings and to FIGS. 1 and 2 in particular, numeral 10 indicates generally a bin for grain such as corn, the bin shown in the drawings being cylindrical in shape and having side walls 12, floor 14 and roof 16. In the embodiment of the invention shown in the drawings, the walls may be constructed of masonry material or they may be constructed of sheet metal or any other suitable material. The walls are essentially imperforate, and the bin is enclosed by the conically shaped sheet metal roof 16 and imperforate floor 14. The size and shape of the bin are not critical since the present system can be adapted to substantially any size and shape bin over a wide range. Grain is normally introduced into the bin by a door in the upper portion, preferably in the roof, and is removed by a door or other suitable outlet near the bottom, neither the inlet nor outlet openings being shown. The bin is normally filled to a line near the lower edge of the roof, where the present system can be made to operate most effectively; however, the system will operate effectively when the amount of grain does not fill the bin.

The present system, which is shown essentially schematically in the drawings, is installed in the bin and, in the embodiment illustrated in FIGS. 1 and 2, consists of a plurality of spaced stacks 20, 22, 24 and 26. Each stack is identical in construction and operation; hence only one will be descrbed in detail. Each stack consists of a cylindrical wall 30 having numerous perforations 32 throughout its surface, both lengthwise and circumferentially. These perforations are sufficiently small that the grain will not pass therethrough, but sufficiently large to permit air to circulate from the space 34 in the bin to and from chamber 36 in the stack. The cylindrical wall extends substantially the full height of the bin and is closed at the lower end by a conical shaped bottom 38 and at the upper end by a conical shaped cover 40. Each stack contains coil unit 42 connected by conduits 44 and 46 at its upper and lower ends to a conventional refrigerating apparatus 50 having coils 52 and a compressor (not shown) contained in housing 54 of the refrigerating unit. The fan 56 driven by motor 58 is shown schematically merely for the purpose of illustrating the complete apparatus and operation. The refrigerating system 50 is reversible so that the coil units may be alternately heating coils or cooling coils. The construction and operation of the refrigerating system for performing this operation are conventional and well known, and hence will not be described herein. If an external heat source is necessary under certain conditions in order to obtain optimum performance, an electrical or steam heating unit may be used in conjunction with the refrigerating unit. Optional variations of the present system which may or may not be used depend upon the conditions under which the system is normally operating.

The conical shaped bottom 38 is imperforate, and is connected by a drain tube 64 to a point outside of the wall of the bin. A trap 66 is preferably included in drain tube 64 to minimize the inflow of ambient air into chamber 36. An expansion valve 68 for coil units 42 is preferably located at the upper end of stack 20 so that the stack will be effective throughout its length. The coil units form a moisture condensation means and perform the function of dehumidifying the air in the air chamber 36 in the stacks. The air circulates through the chamber from space 34, thus providing dry air for conditioning the grain, and the moisture removed from the air in chamber 36 flows downwardly to bottom 38 and hence outwardly through drain tube 64.

In the operation of the foregoing system, stacks 20 and 24, for example, form cooling stacks, whereas stacks 22 and 26 form heat stacks. As the cooling and heating operation progresses, the differential in temperatures causes the air to flow between the two stacks with the dehumidified air passing outwardly in the lower portion of the respective stack, thence through the grain to the lower portion of the heated stack. The heating coils cause the air to pass upwardly and thence through the grain to the cooling coils. This recirculation of the cooled and dehumidified air continually removes the moisture from the grain, the removed moisture flowing from the cooling stack through the drain tube. This operation proceeds for a predetermined time and then the cooling and heating stacks are reversed, i.e. stacks 20 and 24 become heating stacks and stacks 22 and 26 become cooling stacks. The operation then continues in the same manner as previously described with the moisture removed from the air passing outwardly through the drain tubes for stacks 22 and 26. This cycle continues for a predetermined time, and then the operation is again reversed, switching the cooling operation to stacks 20 and 24 and the heating operation again to stacks 22 and 26. The system requires both the cooling and heating sections; however, the coils in the heated stack may also become the heat dissipation coils for the refrigerating and heating unit 50, thus increasing the overall efficiency and economy of the system. The reversal of the cooling and heating stacks in the foregoing manner results in the grain in one area being cooled while the grain in the other area is being heated, and when the reversal takes place, the cooling and heating zones likewise are reversed, thereby producing a contraction and expansion of the grain alternately as the systems are alternated. The contraction and expansion have a beneficial effect on removing the moisture in such a manner that the moisture is removed more uniformly from the individual grains rather than excessively dehydrating the entire mass or dehydrating the individual grains near the surface thereof while leaving the moisture content near the center of the grains relatively high.

Figure 3:
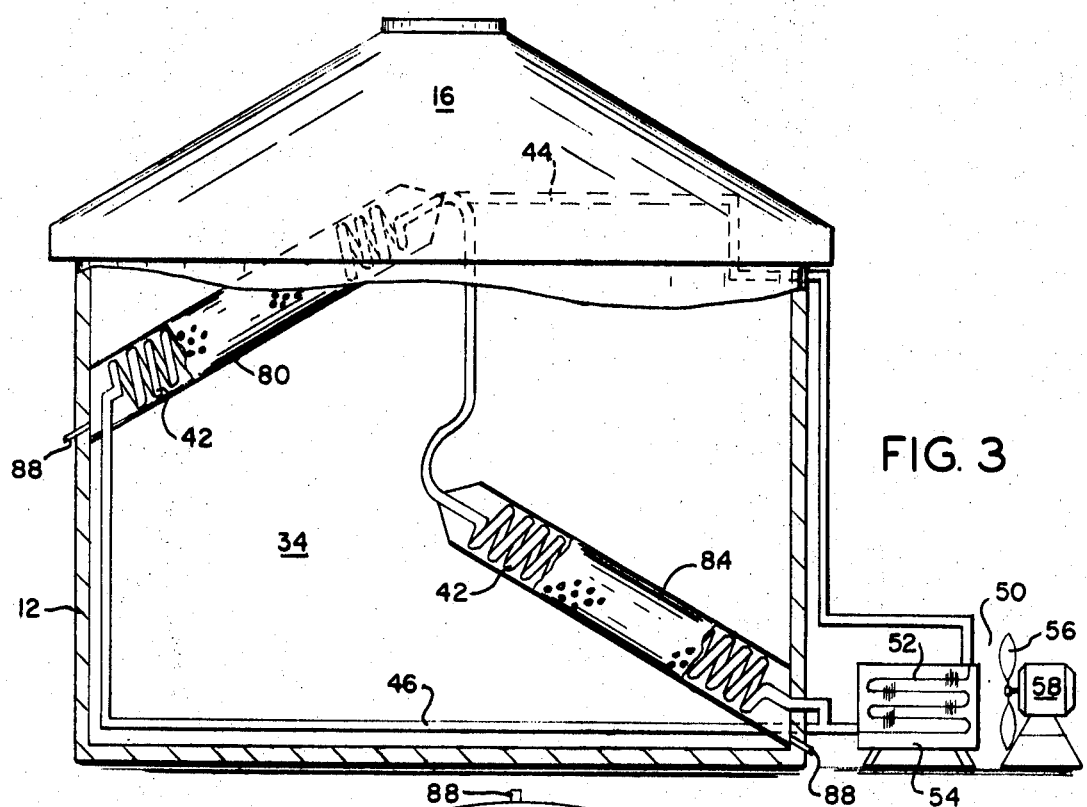
FIG. 3 is a partial elevational and vertical cross sectional view of a modified form of a bin and a modified form of the present grain drying system.
Figure 4:
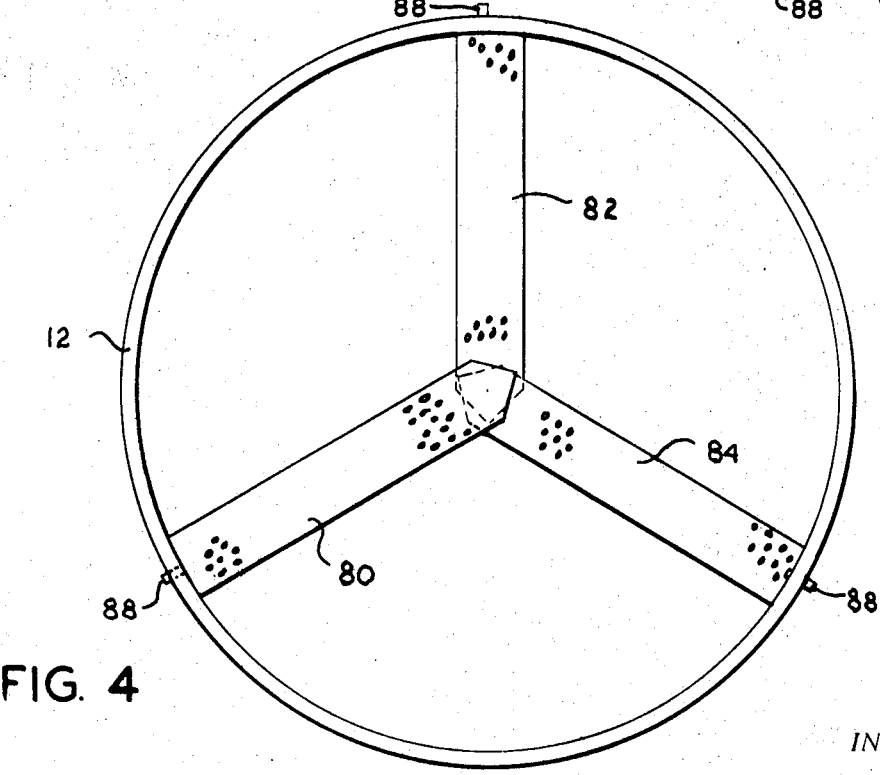
FIG. 4 is a top plan view of the bin and system shown in FIG. 3 with the roof of the bin removed to show more effectively the arrangement of a portion of the system.

In the embodiment of the invention illustrated in FIGS. 3 and 4, the cooling stacks 80, 82 and 84 are inclined upwardly and inwardly toward the center of the bin. This system is otherwise essentially the same as the one previously described herein and hence the same numerals have been given to similar parts of the bin. The refrigerating and heating system 50 is the same as the one previously described herein. However, in the operation of the present system, the stacks are in effect cyclically alternated, as for example, stacks 80 and 82 being cooling stacks and stack 84 a heating stack, thence, as the cycle progresses, stacks 82 and 84 becoming cooling stacks whereas stack 80 becomes a heating stack. In this modified system, two of the stacks may be cooling stacks with one heating stack, or one of the stacks may be a cooling stack with two heating stacks. The lower ends of sacks 80, 82 and 84 are adjacent the external wall of the bin and are drained by tubes 88 communicating with the lower end of the respective stack and extending through the wall of the bin.

Figure 5:
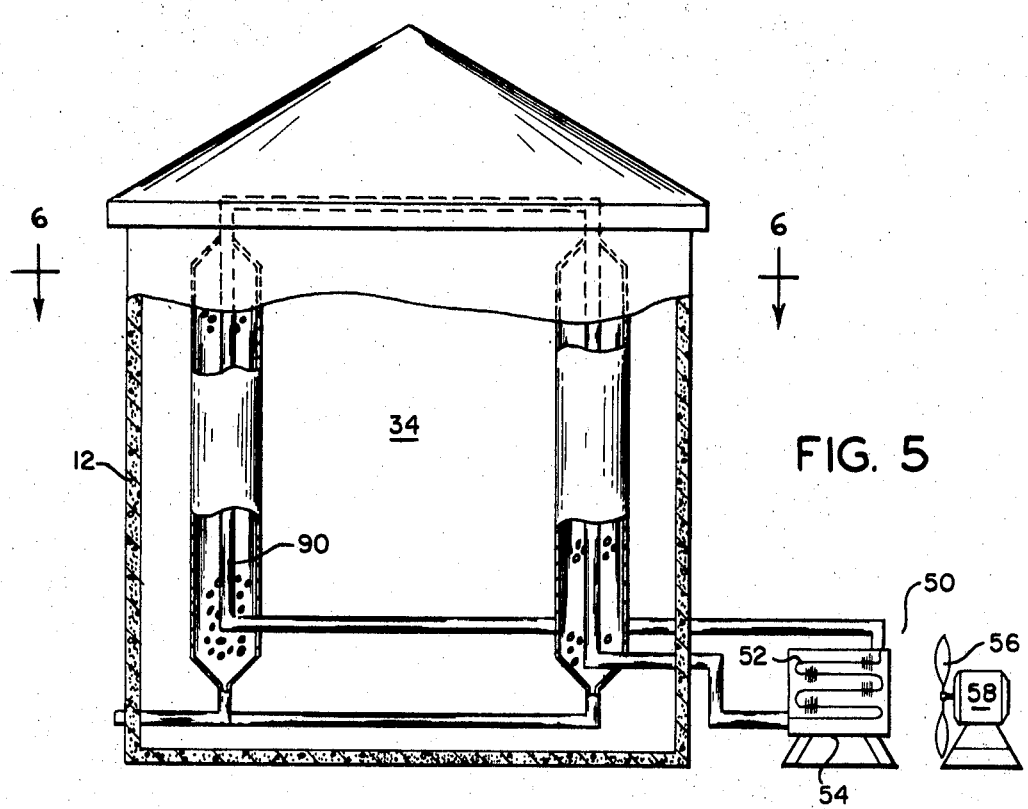
FIG. 5 is a partial elevational and vertical cross sectional view of a further modified form of a bin and a further modified form of the present system therein.
Figure 6:
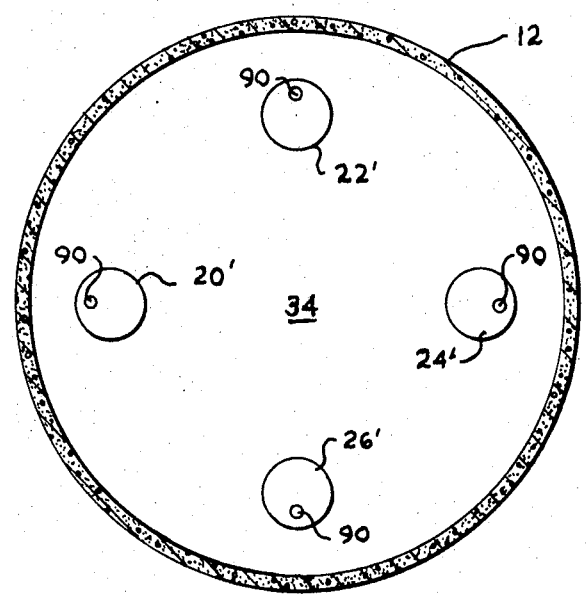
FIG. 6 is a horizontal cross sectional view of the bin and system shown in FIG. 5, the section being taken on line 6—6 of FIG. 5.

The embodiment of the invention illustrated in FIGS. 5 and 6 is essentially the same as that illustrated in FIGS. 1 and 2, and hence like numerals will be given to like parts in this modified form. The stacks are likewise similar to stacks 20, 22, 24 and 26 of FIGS. 1 and 2; however, in the modified form, straight tubular conduits 90 in each of the stacks are used in place of the convolutions of coil units 42. The refrigerating and heating unit is the same in this modificaton, and the heating and cooling are alternately moved from stack 20' and 24' to 22' and 26' in the same manner as previously described with reference to the embodiment shown in FIGS. 1 and 2.

Figure 7:
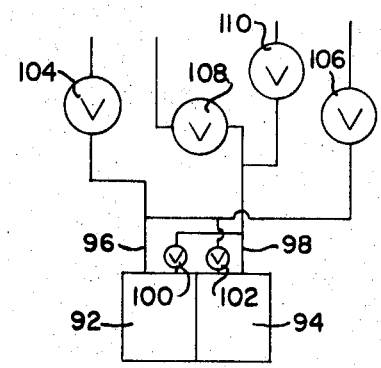
FIG. 7 is a schematic diagram of a portion of the system using the present invention.

FIG. 7 is a schematic diagram of the system showing the cooling and heating sections 92 and 94 of unit 50, and the fluid cooling and fluid heating conduits 96 and 98, respectively. Valves 100 and 102 are operated to reverse the system in the manner described, and valves 104, 106 and 108 and 110 permit regulation of the individual stacks to satisfy the cooling and heating requirements of the several stacks. The refrigerant return lines are not shown.

In the modified form of the invention illustrated in FIGS. 8, 9 and 10, the unit 120 contains a central heating and cooling or heating stack 122 of essentially the same construction and design illustrated previously herein including perforated sidewalls. The second heating and cooling stack is indicated by numeral 124. This modified form of the invention utilitizes the natural heating and cooling by placing the second stack, i.e. stack 124 at the periphery of the dryer grain compartment. This latter stack has an inner wall 126 and an outer wall 128 and cooling or heating coils 130 disposed between the two walls. The inner wall 126 is perforated to permit the air and moisture to flow either inwardly or outwardly depending on the operation of the unit at a particular moment. When the external temperature is rather high, the stack 122 is utilized for the refrigerant and stack 124 is utilized for the heating fluid, thereby obtaining maximum efficiency between the two stacks. Likewise, when the external temperature is rather low, for example at night or in the winter time, the external stack 124 is used for the refrigerant and stack 122 is used for the heating fluid. Stack 122 has drain 132 and stack 124 has drain 134 for the moisture condensed in the respective stack. The refrigerating and heating unit, such as that illustrated at numeral 50 in FIG. 1, is connected to the coils of the two stacks to provide the heating or cooling of the stacks as desired. FIGS. 9 and 10 illustrate embodiments of the modification, single stack 122 being illustrated in FIG. 9 and three stacks, 122, 122' and 122" being illustrated in FIG. 10. The external stack 124 is the same in each embodiment.

While only three modifications of the present grain drying apparatus have been described in detail herein, various changes and modifications may be made without departing from the scope of the invention.

I claim:

1. A grain drying system comprising a compartment for storing grain, a plurality of spaced stacks in said compartment having perforated side walls defining air flow chambers, coils in each of said chambers, fluid cooling and heating means, conduits including valve means connecting said fluid cooling and heating means to the coils of said stacks for simultaneous cooling of one stack and heating of another stack and for alternately cooling and heating the coils in the respective stacks, and drain means for removing moisture condensed on said coils.

2. A grain drying system as defined in claim 1 in which said plurality of spaced stacks consists of four stacks alternately connected to the fluid cooling and heating means to cool and heat the surrounding grain in the compartment.

3. A grain drying system as defined in claim 1 in which said stacks are vertically arranged and the coils are helically shaped.

4. A grain drying system as defined in claim 2 in which said stacks are vertically arranged and the coils are helically shaped.

5. A grain drying system as defined in claim 3 in which said drain means for each stack consists of a tube connected to the bottom of the stack.

6. A grain drying system as defined in claim 3 in which said drain means for each stack consists of straight tubular conduits connected to the bottom of the stack.

7. A grain drying system as defined in claim 1 in which three stacks are utilized and the stacks are positioned in an inclined position extending inwardly and upwardly toward the center of the compartment.

8. A grain drying system as defined in claim 1 in which valves are included in the conduits connecting the cooling and heating means to the stacks for selectively shifting the stacks between the cooling and heating operations.

9. A grain drying system as defined in claim 1 in which one of said stacks substantially surrounds the grain in said compartment and has a perforated wall in contact with the grain and the other of said stacks is disposed within said compartment and normally surrounded by the grain therein.

10. A grain drying system as defined in claim 9 in which the external wall of said compartment forms the external wall of said one stack.

11. A grain drying system as defined in claim 10 in which said perforated wall surrounding the grain is spaced from the external wall defining said compartment and the fluid cooling and heating coils are disposed within the space between said walls.

References Cited
UNITED STATES PATENTS 2,083,732   6/1937   Moore et al. _____ 165—4

CHARLES SUKALO, Primary Examiner

U.S. Cl. X.R.

34—73